United States Patent [19]

Leek

[11] E Patent Number: Re. 33,169

[45] Reissued Date of Patent: Feb. 20, 1990

[54] SIDE STROKING GOLF PUTTER

[76] Inventor: John G. Leek, 1503 Imperial Ave., New Hyde Park, N.Y. 11040

[21] Appl. No.: 268,931

[22] Filed: Nov. 8, 1988

Related U.S. Patent Documents

Reissue of:

[64] Patent No.: 4,621,816
Issued: Nov. 11, 1986
Appl. No.: 748,310
Filed: Jun. 24, 1985

[51] Int. Cl.[4] ..... A63B 53/04; A63B 53/02

[52] U.S. Cl. ..... 273/168; 273/81.3; 273/80 C

[58] Field of Search ..... 273/167 G, 167 K, 167 J, 273/77 R, 77 B, 163 R, 163 A, 164, 80 C, 80.2, 81.3, 194 R, 67 R, 67 C, 67 D, 83; D21/214–220

[56] References Cited

U.S. PATENT DOCUMENTS

| | | | |
|---|---|---|---|
| 3,042,409 | 7/1962 | Johnson | 273/164 |
| 3,574,349 | 4/1971 | Kropp | 273/80 C |
| 3,874,668 | 4/1975 | Flege | 273/81.3 |
| 4,138,117 | 2/1979 | Dalton | 273/80 C |
| 4,227,694 | 10/1980 | Drake | 273/80 C |
| 4,411,429 | 10/1983 | Drew et al. | 273/80 C |
| 4,508,342 | 4/1985 | Drake | 273/80 C |

*Primary Examiner*—Edward M. Coven
*Assistant Examiner*—Sebastiano Passaniti
*Attorney, Agent, or Firm*—Bauer & Schaffer

[57] ABSTRACT

A side stroking golf putter in which the shank portion of the shaft is connected with the putter head above one or more oppositely directed putting faces and the putter head is positioned remote from the user by a connection between the shank and the handle portions to provide the user with a completely free and unobstructed view of the putting faces of the putter head during the stroke of the golf putter and to provide the golfer with better control of the golf putter.

4 Claims, 2 Drawing Sheets

SIDE STROKING GOLF PUTTER

Matter enclosed in heavy brackets [ ] appears in the original patent but forms no part of this reissue specification; matter printed in italics indicates the additions made by reissue.

BACKGROUND OF THE INVENTION

The present invention relates to golf putters and more particularly to side stroking golf putters in which the putter club is swung or stroked through an arc along the side of the body of the user or golfer.

For better control of the golf putter or club, many well-known golfers have taken a straddling stance over the ball by positioning their legs substantially equidistant on opposite sides of the ball thereby enabling them to swing the putter club and its head through an arc between their legs much in the manner of a ball stroking swing used in playing croquet. The ball straddling putting stance or address and the subsequent swing are prohibited by present day rules of golf. An attempt to overcome this problem was made in the U.S. Pat. No. 4,227,694 to Drake in which the shaft of the club was bent to provide an aiming portion in the direction of the putt with the consequent result that the user's or golfer's view of the putting face and ball being struck by the putter head were obstructed and obscured.

Other disclosures of putters with offset shafts or offset connections with the putter head, although not used in side strokinfg putters, are taught in the following patents:

Citro, U.S. Pat. No. Des. 202,504
Ehrich, U.S. Pat. No. Des. 230,750
Stone, U.S. Pat. No. Des. 271,604
Koorland, U.S. Pat. No. 3,077,350
Skelly, U.S. Pat. No. 4,199,144
Drew, U.S. Pat. No. 4,411,429

SUMMARY OF THE INVENTION

The present invention provides a true side stroking golf putter which complies with present golfing rules and which provides the golfer or user with a complete and unobstructed view of the putting head, its putting faces, the ball, and the club throughout the putting stroke. Moreover, the club enables the golfer to assume a legally permissible address to the ball during the putting stroke while assuming a stance that is fully balanced and stable. The position of the golf putter handle proximate or as close as possible to the side of the user or golfer while enabling the putter head to be swung or stroked spaced orremote from the side of the golfer permits and enables the golfer to pivot the club about a point that is substantially fixed in space so that the golf club may be swung or stroked through an arcuate line that is completely within the view of the golfer or user.

The above description, as well as further objects, features and advantages of the present invention, will be more fully appreciated by reference to the following details description of a presently preferred, but nonetheless illustrative, embodiment in accordance with the present invention when taken in conjunction with the accompanying drawings wherein:

DESCRIPTION OF THE INVENTION

Figure 1:
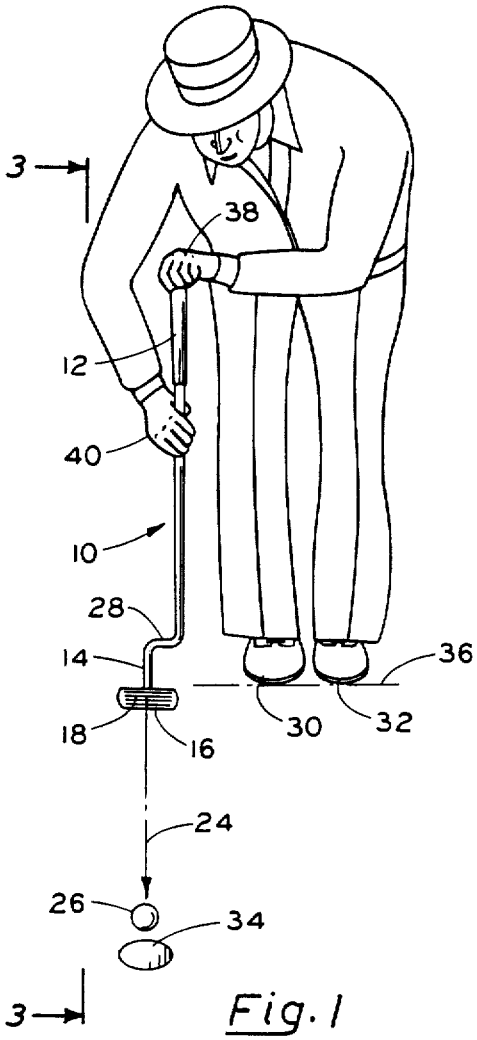
FIG. 1 is a front elevational view of the side stroking golf putter constructed according to the teaching of the invention and illustrating its manner of use by a right-handed golfer.
Figure 1A:
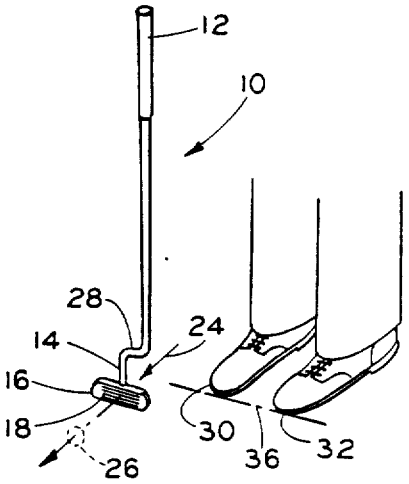
FIG. 1A is a partial perspective view of FIG. 1.

Referring now to the drawings, the side stroking golf putter of the present invention is generally identified by the numeral 10 and comprises a shaft that has a handle 12 at its upper portion. The handle 12 may be of any conventional length and cross section or shape. In the illustration of the drawings it is shown to be round. However, this illustration is for convenience only and is not to constitute a limitation upon the scope of the invention.

Figure 2:
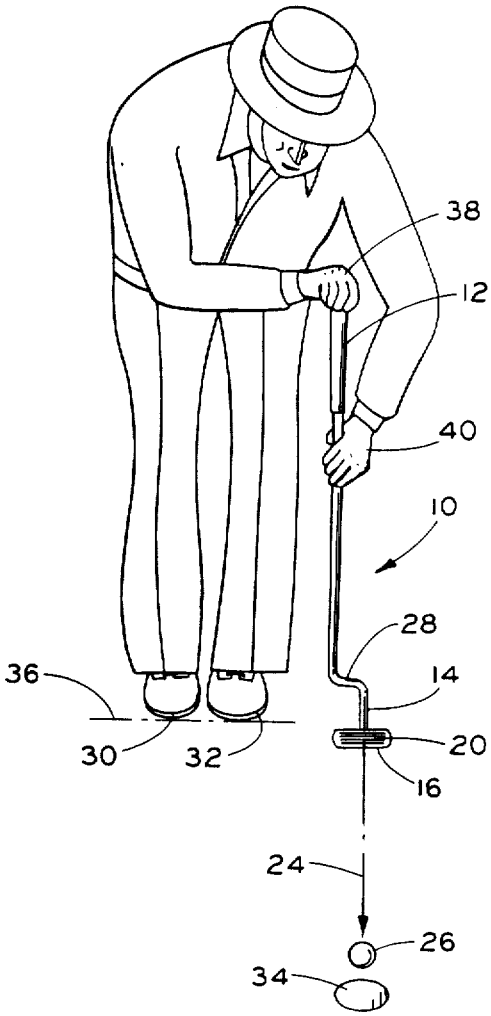
FIG. 2 is a view similar to FIG. 1 showing the use of the side stroking golf putter by a left-handed putter.
Figure 3:
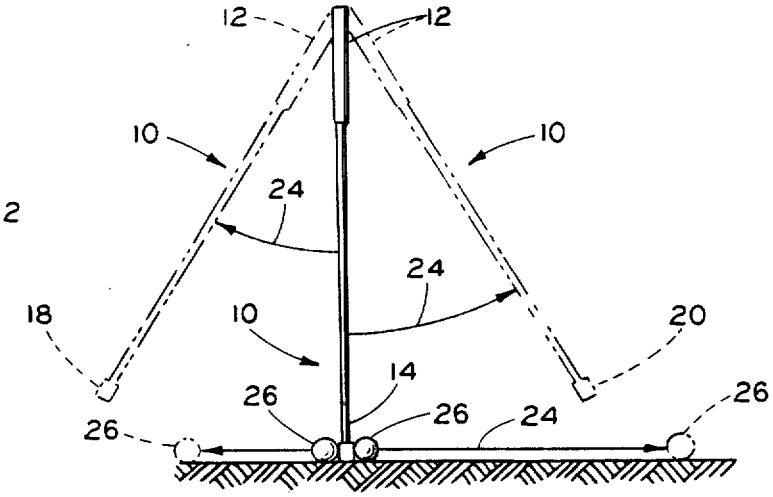
FIG. 3 is a vertical side view of the golf putter constructed according to the invention and illustrating its swing in either direction.
Figure 4:
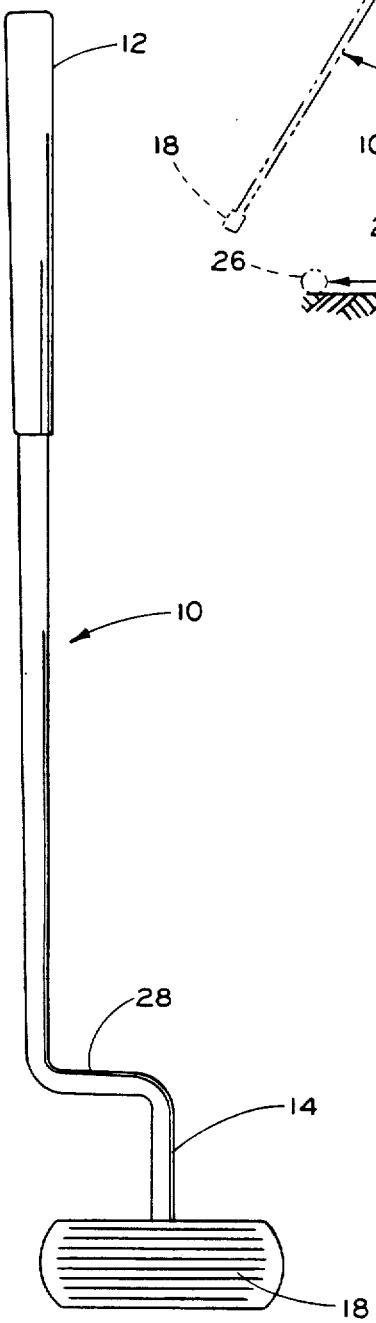
FIG. 4 is an enlarged front elevational view of the details of the golf putter shown in use in FIG. 2.
Figure 5:
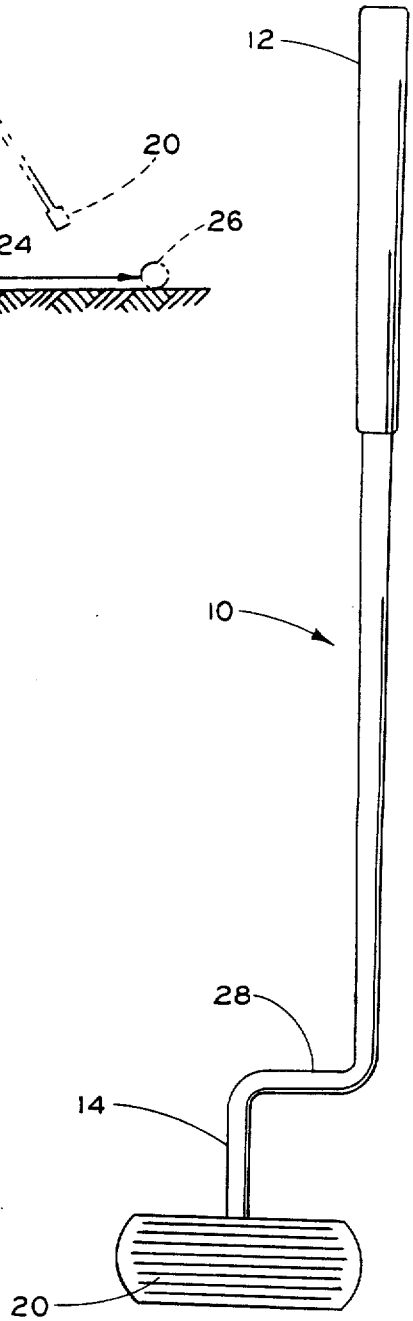
FIG. 5 is an enlarged view of the details of the golf putter as shown in use in FIG. 1.

The lower end of the shaft has a shank portion 14 that is connected with a putter head 16 that may be of any desired shape and material. The illustration of the putter head 16 in the form of a blade in the drawings is made solely to enable a ready and easy explanation of the invention and is not to be considered a limitation upon its scope. As shown, the putter head 16 may be multi-sided and will have at least one putting face 18. In practice, the present invention is sufficiently unique in its teaching as to enable the putter head 16 to be made with two putting faces 18 and 20. Each putting face will be on the opposite sides of the putting head and will face in opposite directions to enable the putter 10 to be used with equal ease and facility by both right and left-handed golfers or users. This versatility is clearly illustrated in FIGS. 1 and 2, FIG. 3, and FIGS. 4 and 5.

The putter head 16 may be of any thickness that will enable the shank portion 14 of the golf club shaft to be fixedly connected or joined to the same between the putter faces 18 and 20 without obstructing or interfering with the same or with a view of such faces. When the shank 14 is joined together with the putter head 16, it may be centrally mounted to the same both between the faces 18 and 20 and along the elongations of the putting faces so as to be positioned at substantially the center of the mass of the putter head 16 to thereby concentrate the power and force of the putting stroke against a golf ball 26 addressed by the putter.

As can be seen from the drawings, the handle 12 and the vertically extending shank portion 14 of the putter shaft are out of alignment with each other so that the shank portion 14 is positioned more remote or spaced from the golfer or user while the handle portion 12 is positioned alongside and closer to the same or adjacent side of the user. This is done to enable the user to stroke the golf putter 10 smoothly and to move it through a line or regular arc 24 without hesitation much in the same manner as the club head 16 and its faces 18 and 20 would be stroked if the ball 26 were straddled by the golfer.

To retain the handle and shank portions 12 and 14 in their relatively spaced non-aligned relationship with the handle portion closer in position to the golfer and the shank portion more remotely spaced from the side of the golfer, the side stroking putter shaft includes a connecting portion 28 that connects the two portions 12 and 14 together. The connecting portion 28 is shown formed as an integral monolithic continuation of and substantially perpendicular to the two portions 12 and 14 and extends from the [vertically] extending handle portion 12 in a direction outward or away from the golfer toward its connection and jointure with the shank portion 14. Described in the alternative, the handle portion 12 is positioned alongside of and closer to the adjacent side of the golfer or user for better control of the club while the connecting portion 28 positions the shank portion 14 and club head 16 more remote or spaced from the golfer to provide a complete and unrestricted observation of its movement.

In practice it may be possible to form all such portions 12, 14, and 28 as separate elements and to join them together as integral coextensions of each other with no separations therebetween. However, at present it has been found that the same may be made of monolithic construction so that none of the turns or bends of any of the portions is weaker than any of the others.

The connection portion 28 is bent in the direction of the elongation of the putter head 16 toward the body of the golfer and is spaced thereabove to be exactly or at least substantially in line with the same. The alignment of the connecting portion 28 and the elongated body of the putting head 16 with each other assures that when the putter 10 is viewed from the top thereof the connecting portion 28 and the top of the putter head 16 appear as the same structure. However, when the connecting portion 28 is of less thickness than that of the putter head 16, the golfer or user is provided with an even better view of both the connecting portion and the aligned head therebeneath.

Therefore, it is desirable and suggested that the thickness of the top of the head 16 and the connecting portion 28 be either of the same thickness or that the connecting portion 28 be thinner than that of the head 16. By so doing, the golfer is presented with a view of both the connecting portion 28 in alignment with the putter head 16 directly beneath, both of which are free of obstruction of the other and both of which provide the golfer with a view of its putting faces 18 and 20 free of any obstruction. Thus, the golfer is provided with a full and unobstructed view of the putting head, its putting faces and of the ball 26 as well as the full length of the golf club 10 during the address and during the movement of the golf shaft during the putting stroke.

In practice, the putter 10 is placed with its face 18 or 20, as the case may be for a right or left-handed golfer, flat against the ball 26. The face 18 or 20 is generally positioned perpendicular to the line of arc 24 that is normally aligned with the cup 34, assuming that the lie of the putting green is flat and level.

The user of the present side stroking golf putter 10 may stand with his or her two feet 30 and 32 pointed in the direction of the golf cup 34 with the feet positioned substantially on the same line 36. It is noted that some golfers may feel more comfortable by positioning one foot further ahead of the other in the direction of the golf cup 34. In the illustration of the drawing the two feet are shown positioned substantially evenly on the line 36. This should not be deemed to be a limitation on the scope of the invention. No matter how the golfer stands and no matter which foot may be positioned forward or behind the other, the same is well within the golf rules as presently promulgated.

The golf user then strokes the club 10 by holding it in a fixed pivot formed by the topmost hand 38. The topmost hand grips either the very top of the handle 12 of the club or the side of the handle to hold the club in the fixed pivot. This permits the lower hand 40 to stroke or back swing the club 10 rearward initially and then to stroke it forward to strike against the ball 26 while it is moved precisely along its line of arc 24. During such rearward and forward stroking movements, the golfer is continuously provided with a full and free and unobstructed view of the golf club shaft and all of its attendant details including the ball to be struck thereby. It will be noted from the illustrations in FIGS. 1 and 2 that the golfer is able to oversee fully both the fixed pivot hand 38 and to sight down along the golf club to the point of impact of the putter face 18 or 20 with the golf ball 26. This is enabled by the positioning of the handle portion 12 of the golf shaft as close as possible to the side of the golfer at which the putting stroke is performed.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. A side stroking double-faced golf putter for swinging front and rear along the sides of the body in the direction of the length of the feet of the user comprising a head having elongated putting faces in opposite directions on said head for putting in opposite directions, a shaft connected with said head to move the same through a putting swing in the opposite directions of said putting faces, said shaft having an elongated [vertical] single handle portion for swinging the head in the opposite directions of said faces and a relatively shorter vertical shank portion connected with the head proximate the center of the length of the head above and centrally between said elongated putting faces and spaced remote from and non-aligned with said handle in a direction away from the side of the body of the user, and said shaft having a connection portion offset from and substantially perpendicular to said vertical shank portion connecting said non-aligned shank and handle portions together in vertical spaced non-aligned relationship with said handle portion closer to the side of the body of the user than said shank portion, said connection portion being spaced remote from said handle portion and adjacent to said head and aligned with and between said elongated putting faces.

2. A golf putter as in claim 1, said connecting portion being disposed horizontal in the direction of the elongated putting faces toward and away from the side of the user of the putter so that the non-aligned shank and handle portions provide the user with an unobstructed view of the putting face.

3. A golf putter as in claim 2, said putting head being substantially blade shaped with said elongated putting faces each on opposite and relatively spaced sides thereof and extending for the length thereof for putting by right and left-handed golfers.

4. A golf putter as in claim 1, said connecting portion being directed substantially in line with and spaced above said putter head and spaced away from said shank connection with said putter head to position said putter head a distance more remote from the side of the body of the golfer than said handle to provide the golfer with an unobstructed view of the putting face.

* * * * *